(12) United States Patent
Kinoshita et al.

(10) Patent No.: US 10,732,486 B2
(45) Date of Patent: Aug. 4, 2020

(54) ELECTRONIC DEVICE

(71) Applicant: LENOVO (SINGAPORE) PTE. LTD., Singapore (SG)

(72) Inventors: Hiroaki Kinoshita, Yokohama (JP); Takehito Yamauchi, Yokohama (JP); Shigehiro Horiuchi, Yokohama (JP); Hiroki Hirano, Yokohama (JP); Masaaki Neguchi, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 393 days.

(21) Appl. No.: 15/722,676

(22) Filed: Oct. 2, 2017

(65) Prior Publication Data

US 2019/0033686 A1  Jan. 31, 2019

(30) Foreign Application Priority Data

Jul. 27, 2017 (JP) .................................. 2017-145307

(51) Int. Cl.
*G03B 11/04* (2006.01)
*G06F 1/16* (2006.01)

(52) U.S. Cl.
CPC .......... *G03B 11/043* (2013.01); *G06F 1/1616* (2013.01); *G06F 1/1686* (2013.01)

(58) Field of Classification Search
CPC .................................................... G03B 11/04

USPC .......................................... 396/448; 359/511
See application file for complete search history.

(56) References Cited

U.S. PATENT DOCUMENTS

| 2010/0102979 | A1* | 4/2010 | Huang ................. G06F 1/1616 340/686.1 |
| 2011/0099908 | A1* | 5/2011 | Fortmann ............. G06F 1/1613 49/373 |
| 2011/0182029 | A1* | 7/2011 | Wu ....................... G06F 1/1686 361/679.55 |
| 2015/0009399 | A1  | 1/2015 | Jonsson |
| 2016/0163010 | A1* | 6/2016 | Moharir ................ G06Q 50/24 348/14.02 |

FOREIGN PATENT DOCUMENTS

| JP | 2005252872 A | 9/2005 |
| JP | 3170619 U | 9/2011 |
| JP | 2016021259 A | 2/2016 |

* cited by examiner

*Primary Examiner* — Clayton E. LaBalle
*Assistant Examiner* — Fang-Chi Chang
(74) *Attorney, Agent, or Firm* — Shimokaji IP (57) ABSTRACT

The present disclosure provides an electronic device without the necessity of a separate member shielding a camera. The electronic device comprises a lens cover unit of a Laptop PC at least partially accommodated in a cover. The lens cover unit is movable between a first position, where a light transmitting cover which is a light transmitting portion faces a camera, and a second position, where a thick portion which is a camera shielding portion shields the camera.

4 Claims, 10 Drawing Sheets

ELECTRONIC DEVICE

FIELD OF THE INVENTION

The present invention relates to an electronic device.

BACKGROUND OF THE INVENTION

As an electronic device having a camera, a notebook type personal computer (hereinafter referred to as "Laptop PC") described in Patent Document 1, for example, is known. The camera of the Laptop PC is controlled by a personal computer CPU and photographs a user in front of a display panel (display) or the like.

[Patent Document 1]

Japanese Patent Application Laid-Open No. 2016-21259

SUMMARY OF THE INVENTION

In such a Laptop PC, it is preferable that, when hacked by a third party, the photographing with the camera can be prohibited for privacy protection. A method including attaching a seal shielding a camera to the outer surface of the Laptop PC is known. Moreover, a method is also known which includes attaching a shutter which can be manually opened and closed by a user to the outer surface of the Laptop PC, and then bringing the shutter into a closed state to thereby shield a camera.

However, such a seal and a shutter have been required to be prepared separately from the Laptop PC. Moreover, the attached shutter projects from the outer surface of the Laptop PC, which has posed problems that the design property has decreased or the projected shutter serves as an obstacle in using the Laptop PC.

It is an object of the present invention to provide an electronic device without the necessity of separately preparing a member shielding a camera.

In order to solve the above-described problems, an electronic device according to one aspect has a display panel displaying predetermined information, a cover surrounding the circumference of the display panel, a camera which is accommodated in the cover and photographs the front of the cover, and a lens cover unit in which a light transmitting portion formed of a material transmitting light and a camera shielding portion formed of a material not transmitting light are integrally configured. The lens cover unit is at least partially accommodated in the cover and is movable between a first position where the light transmitting portion faces the camera and a second position where the camera shielding portion shields the camera.

According to this aspect, the lens cover unit is at least partially accommodated in the cover. Therefore, there is no necessity of preparing a member shielding the camera separately from the electronic device.

Moreover, the lens cover unit is movable between the first position and the second position. When the lens cover unit is disposed at the first position, the light transmitting portion of the lens cover unit faces the camera, and therefore photographing with the camera is enabled. On the other hand, when the lens cover unit is disposed at the second position, the camera shielding portion of the lens cover unit shields the camera, and therefore photographing with the camera is prohibited. Thus, by selectively disposing the lens cover unit at the first position and the second position by a user, the state in which the photographing with the camera is enabled and the state where the photographing with the camera is prohibited can be switched.

In order to solve the above-described problems, an electronic device according to another aspect has a display panel displaying predetermined information, a cover surrounding the circumference of the display panel, a camera which is accommodated in the cover and photographs the front of the cover, and a shutter having a camera shielding portion formed of a material that does not transmit light. A camera hole is formed in the cover. The camera is disposed so as to perform the photographing through the camera hole. The shutter is entirely accommodated in the cover and is movable between a first position where the camera is opened and a second position where the camera shielding portion shields the camera.

According to this aspect, the shutter is entirely accommodated in the cover. Therefore, there is no necessity of preparing a member shielding the camera separately from the electronic device. Moreover, the mechanism for moving the shutter can be protected by the cover.

Moreover, the shutter is movable between the first position and the second position. When the shutter is disposed at the first position, the camera is opened, and therefore photographing with the camera is enabled. On the other hand, when the shutter is disposed at the second position, the camera shielding portion of the shutter shields the camera, and therefore photographing with the camera is prohibited. Thus, by selectively disposing the shutter at the first position and the second position by a user, the state in which photographing with the camera is enabled and the state where photographing with the camera is prohibited can be switched.

The above-described aspect of the present invention can provide an electronic device without the necessity of separately preparing a member shielding the camera.

DETAILED DESCRIPTION OF THE INVENTION

A preferable embodiment of the present invention is described with reference to the accompanying drawings. The present invention is applicable to various electronic devices, such as a Laptop PC, a desktop type personal computer, a server, a tablet type computer, and a smart phone, for example.

The following embodiment is an example in which the present invention is applied to a Laptop PC. In the accom-

First Embodiment

Figure 1:
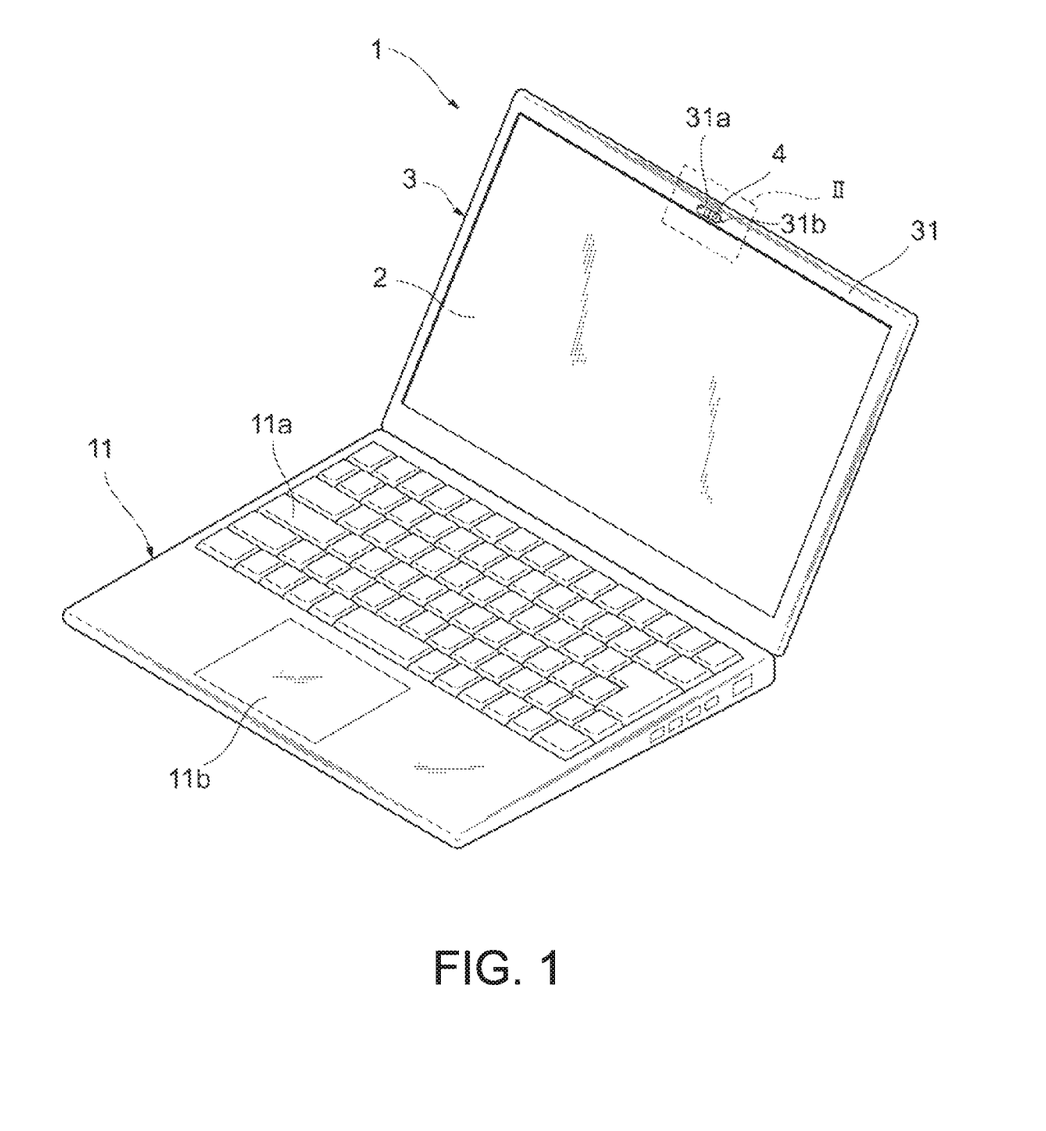
FIG. 1 is a perspective view illustrating a Laptop PC according to a first embodiment.

First, the outline of a Laptop PC 1 according to a first embodiment is described with reference to FIG. 1. FIG. 1 is a perspective view illustrating the Laptop PC 1. The Laptop PC 1 has a main body 11 and a cover 3.

The main body 11 has a flat box shape. In the main body 11, a substrate, a CPU, a memory, an HDD, an SSD, a battery, and the like which are not illustrated are accommodated. On the upper surface of the main body 11, input devices receiving inputs from a user, such as a keyboard 11a and a touchpad 11b, are provided.

The cover 3 is formed of a resin material and accommodates electronic components, such as an LCD module 2, therein. The cover 3 is configured so as to be connected to an end portion of the main body 11 through hinges (not illustrated) to be openable and closable with respect to the main body 11. The cover 3 covers the keyboard 11a and the like in a closed state to protect the same. The cover 3 is raised as illustrated in FIG. 1 in an opened state to expose the keyboard 11a and the like. Hereinafter, in the state where the cover 3 is raised, a direction from the cover 3 side to a user side is referred to as "front" and a horizontal direction viewed from a user facing the cover 3 is referred to as "width direction".

The LCD module 2 is an example of a display panel. The LCD module 2 displays various kinds of information based on the inputs received by the keyboard 11a and the touchpad 11b. In detail, first, a graphics controller (not illustrated) performs a predetermined operation based on the inputs received by the keyboard 11a and the like, and then transmits control signals corresponding to the operation results to the LCD module 2. The LCD module 2 receives the control signals to display images and characters.

The cover 3 has a bezel 31. The bezel 31 is a frame body and exposes the LCD module 2 through the inside of the frame. A long hole 31a is formed in an upper-end portion of the bezel 31 (hereinafter referred to as "upper-end portion of the bezel 31") and in a substantially central portion in the width direction of the raised cover 3. In the long hole 31a, a lens cover unit 4 is disposed.

Figure 2:
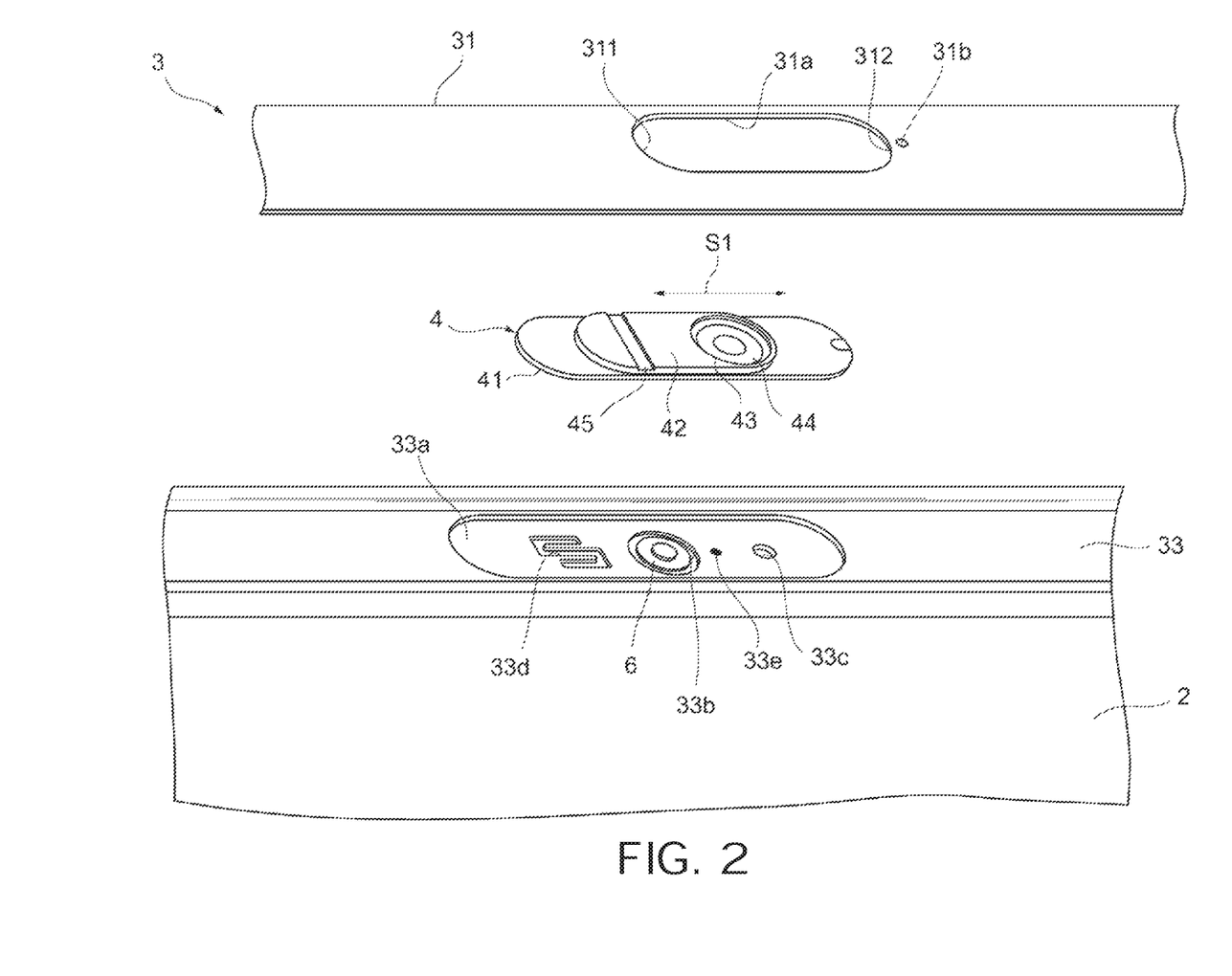
FIG. 2 is an exploded view illustrating a II portion of FIG. 1.

Next, the configuration of the upper-end portion of the bezel 31 is described with reference to FIG. 2. FIG. 2 is an exploded view illustrating a II portion of FIG. 1. FIG. 2 illustrates the II portion obliquely viewed from the main body 11 side.

In the long hole 31a, the width direction is the longitudinal direction. A central portion of the long hole 31a in the width direction linearly extends with an equal width. On the other hand, end portions 311 and 312 of the long hole 31a have an arc shape and the width thereof gradually decreases. On the side of the long hole 31a, an LED hole 31b is formed. Both the long hole 31a and the LED hole 31b penetrate the bezel 31 in the thickness direction.

Inside the bezel 31, an inner cover 33 and a lens cover unit 4 are disposed. The inner cover 33 is a thin plate-like member disposed between the bezel 31 and an outer cover 32 (see FIG. 4) of the cover 3. In the inner cover 33, the front is partially covered with the bezel 31.

In the inner cover 33, a recessed portion 33a is formed in a central portion. The recessed portion 33a is recessed in the thickness direction of the inner cover 33, and the width direction is the longitudinal direction. In the recessed portion 33a, a camera hole 33b, an LED hole 33c, a guide groove 33d, and a shield indicator 33e are provided. The camera hole 33b, the LED hole 33c, the guide groove 33d, and the shield indicator 33e are linearly arranged along the longitudinal direction of the recessed portion 33a.

Both the camera hole 33b and the LED hole 33c penetrate the inner cover 33 in the thickness direction. The camera hole 33b is formed in front of the camera 6 accommodated in the cover 3 and partially exposes the camera 6. The LED hole 33c is formed in front of a light emitting diode 7 (see FIG. 4, for example) mounted on a substrate 5 described later. The light emitting diode 7 is an example of an energization indicator and emits light when the camera 6 is energized.

The camera 6 is a photographing device which has a lens and an image sensor (not illustrated) and collects light to generate image data. The camera 6 is mounted on the substrate 5.

The shield indicator 33e is provided at a portion between the camera hole 33b and the LED hole 33c of the recessed portion 33a. The shield indicator 33e is a pattern drawn with paint. As the shield indicator 33e, a red circle is mentioned, for example.

The guide groove 33d penetrates the inner cover 33 in the thickness direction. In the guide groove 33d, a projection 46 (see FIG. 4) of the lens cover unit 4 described later is disposed.

The lens cover unit 4 is a thin plate-like member formed of a resin material. The lens cover unit 4 is disposed in the recessed portion 33a of the inner cover 33. The size of the lens cover unit 4 in the width direction is smaller than the size of the recessed portion 33a.

The lens cover unit 4 has a thin portion 41 and a thick portion 42. The thin portion 41 is an example of an energization indicator shielding portion and the thick portion 42 is an example of the camera shielding portion. The thick portion 42 is bulged in the central portion of the lens cover unit 4 in the width direction and the thickness thereof is larger than that of the thin portion 41. Both end portions of the thick portion 42 have an arc shape of a radius which is substantially the same as the end portions 311 and 312 of the long hole 31a of the bezel 31.

In the thick portion 42, a through-hole 43 penetrating the thick portion 42 in the thickness direction is formed. A light transmitting cover 44 is fitted to the through-hole 43. The light transmitting cover 44 is an example of the light transmitting portion and is formed of materials transmitting visible light, such as resin materials, such as polyethylene terephthalate, polystyrene, polypropylene, and acryl, and glass. A groove 45 is formed in a portion on the side of the through-hole 43 of the outer surface of the thick portion 42. The groove 45 linearly extends.

The inner cover 33 is covered with the bezel 31 in a state where the lens cover unit 4 is disposed in the recessed portion 33a. Thus, the thick portion 42 of the lens cover unit 4 is disposed in the long hole 31a of the bezel 31 and projects ahead. On the other hand, the thin portion 41 of the lens cover unit 4 is disposed between the bezel 31 and the inner cover 33.

As described above, the size of the lens cover unit 4 in the width direction is smaller than the size of the recessed portion 33a. Therefore, as indicated by an arrow S1, the lens cover unit 4 disposed in the recessed portion 33a can slide and move in the width direction (i.e., longitudinal direction of the long hole 31a). By the slide movement, the lens cover unit 4 can be disposed at a first position and a second position as described later.

Figure 3:
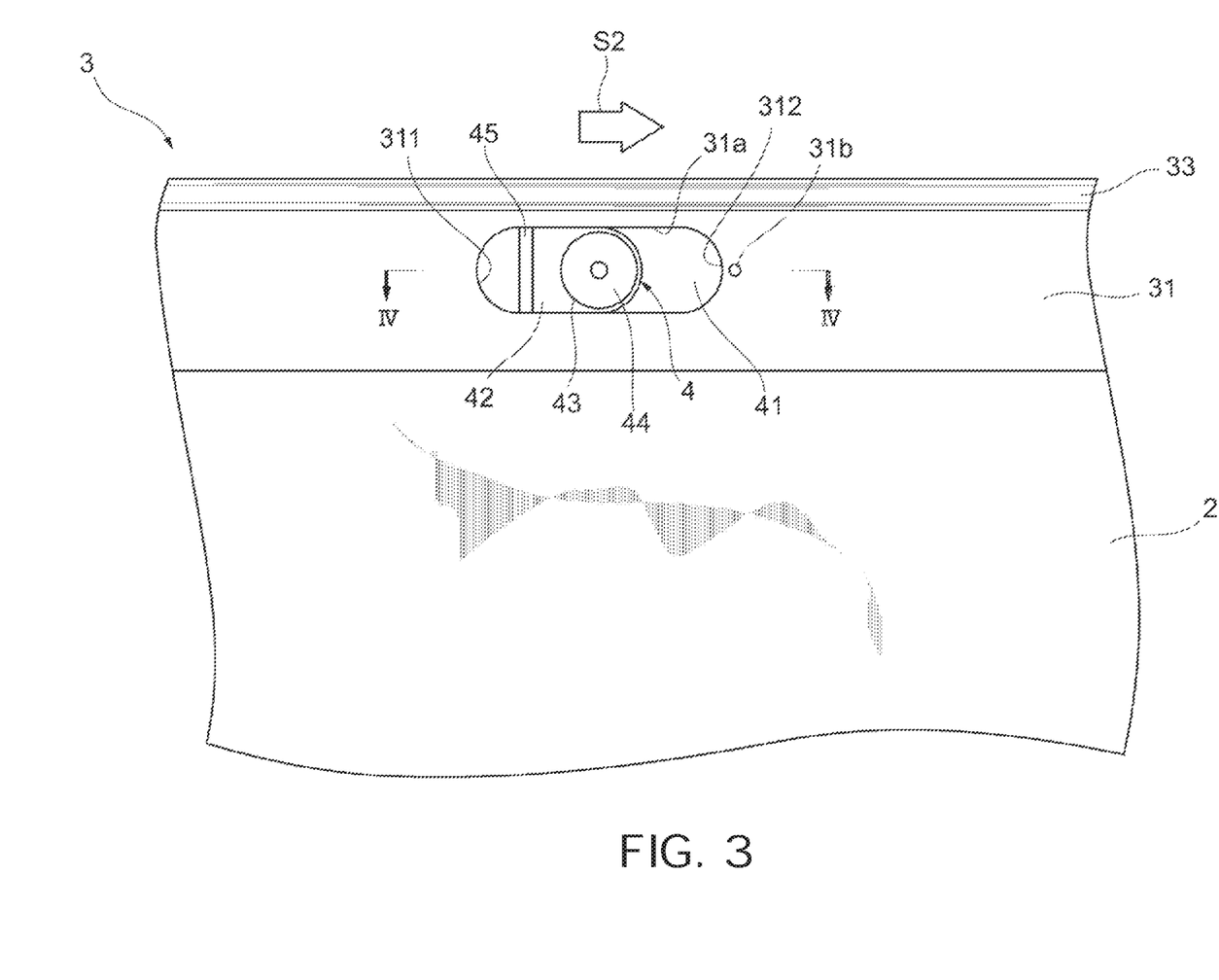
FIG. 3 is a front view illustrating the II portion of FIG. 1.
Figure 4:
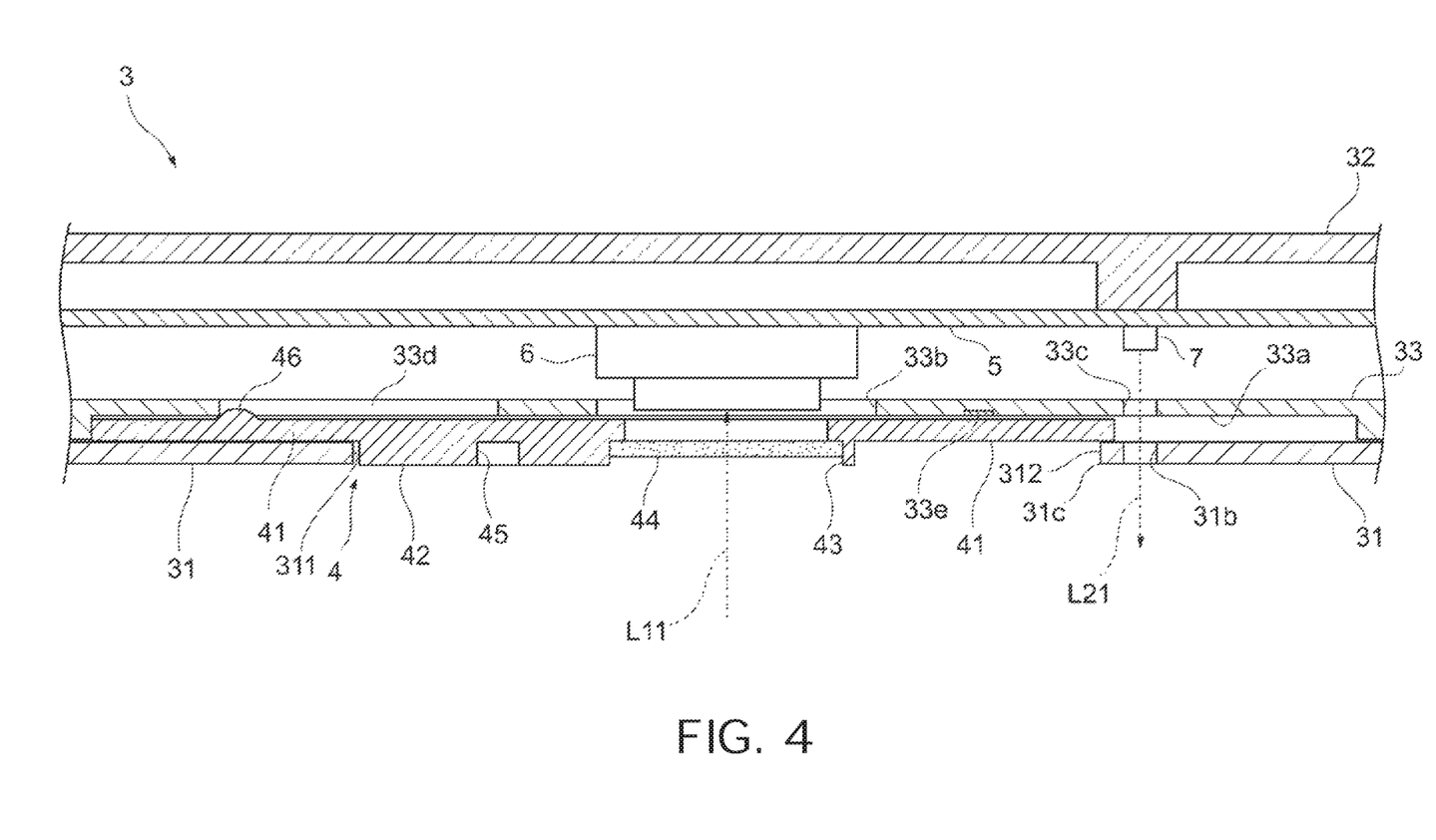
FIG. 4 is a cross-sectional view illustrating a IV-IV cross section of FIG. 3.
Figure 5:
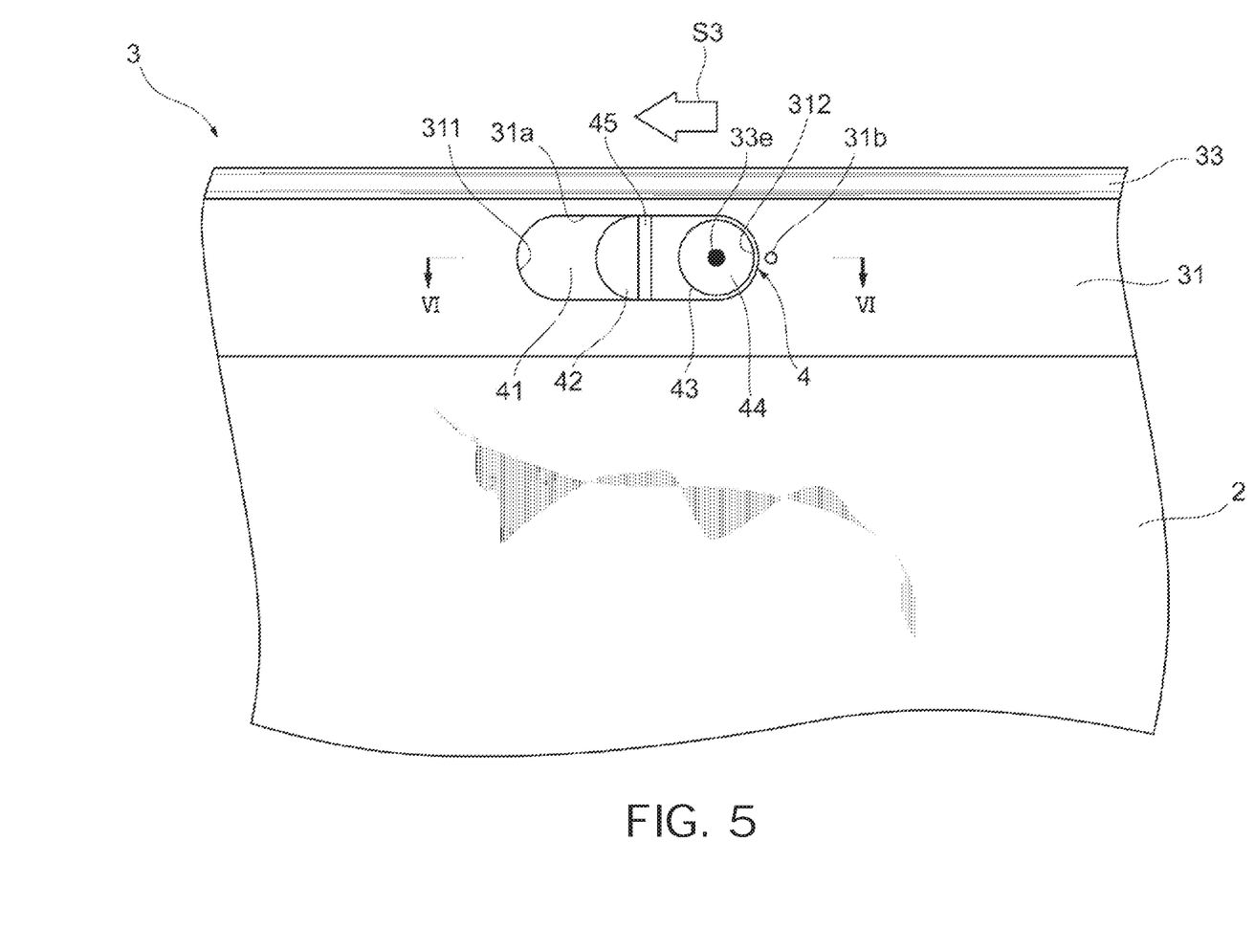
FIG. 5 is a front view illustrating the II portion of FIG. 1.
Figure 6:
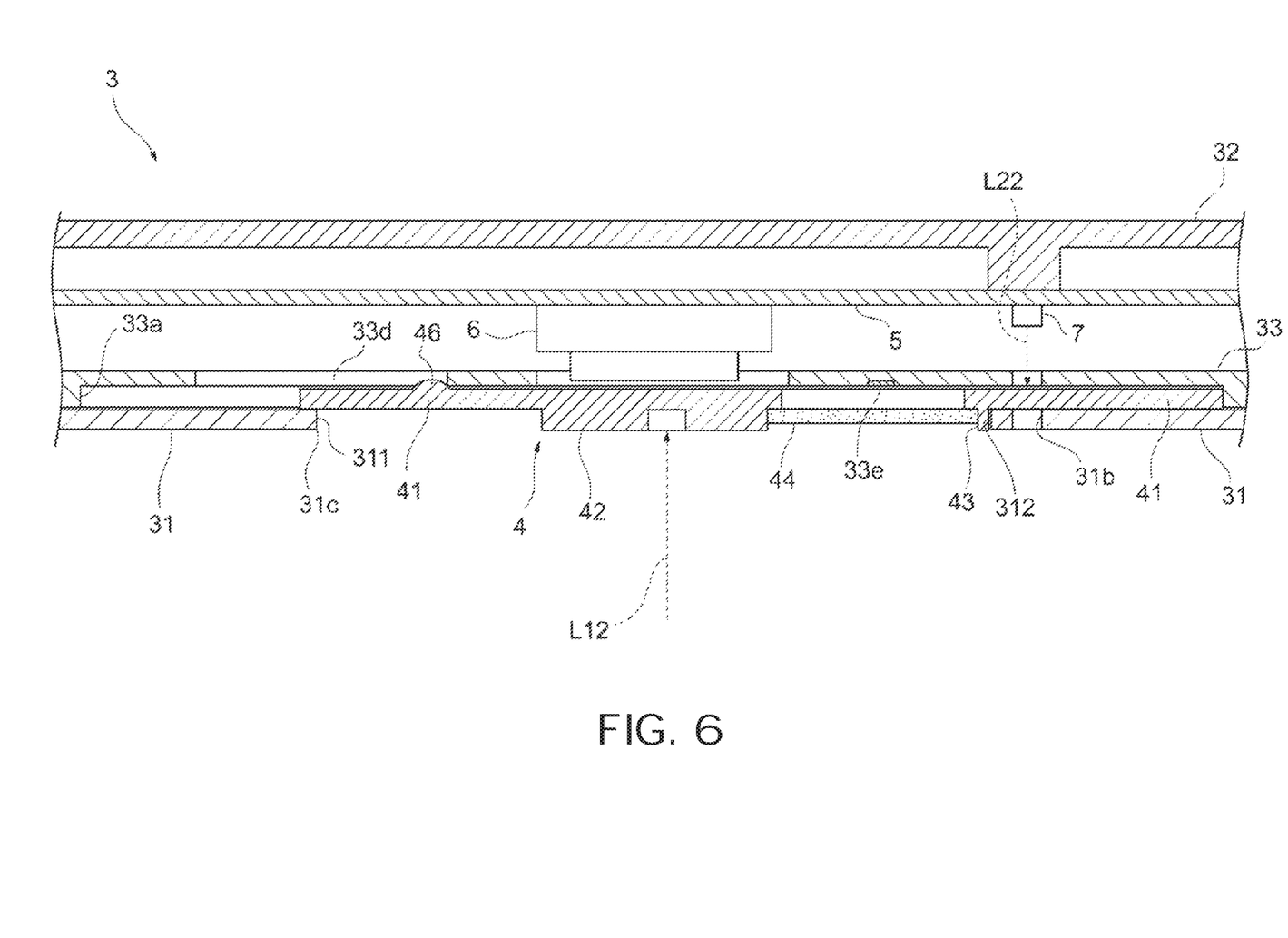
FIG. 6 is a cross-sectional view illustrating a VI-VI cross section of FIG. 5.

Next, functions of the lens cover unit 4 are described with reference to FIG. 3 to FIG. 6. FIG. 3 and FIG. 4 illustrate the cover 3 in a state where the lens cover unit 4 is disposed at the first position. FIG. 3 is a front view illustrating the II portion of FIG. 1. FIG. 4 is a cross-sectional view illustrating a IV-IV cross section of FIG. 3. FIG. 5 and FIG. 6 illustrate the cover 3 in a state where the lens cover unit 4 is disposed at the second position. FIG. 5 is a front view illustrating the II portion of FIG. 1. FIG. 6 is a cross-sectional view illustrating the VI-VI cross section of FIG. 5.

[Case where Lens Cover Unit 4 is Disposed at First Position]

In this case, the thick portion 42 of the lens cover unit 4 is brought close to the end portion 311 of the long hole 31a of the bezel 31 as illustrated in FIG. 3 and FIG. 4. Herein, as illustrated in FIG. 4, the thick portion 42 is offset-arranged from the camera 6, and the through-hole 43 is disposed in front of the camera 6. Thus, the light transmitting cover 44 fitted to the through-hole 43 faces the camera 6.

As described above, the light transmitting cover 44 is formed of the materials transmitting visible light. Therefore, as indicated by an arrow L11 in FIG. 4, the camera 6 collects light through the light transmitting cover 44 from the front of the cover 3, and generates image data based on the light collection. More specifically, when the lens cover unit 4 is disposed at the first position, the photographing in front of the cover 3 with the camera 6 is enabled.

As illustrated in FIG. 4, the lens cover unit 4 is not disposed in front of the light emitting diode 7. Therefore, light emitted by the light emitting diode 7 is emitted to the outside of the cover 3 through the LED hole 33c of the inner cover 33 and the LED hole 31b of the bezel 31 as indicated by an arrow L21. A user can grasp based on the fact that the light is emitted from the LED hole 31b that the camera 6 can photograph the front of the cover 3.

[Slide Movement of Lens Cover Unit 4 from First Position to Second Position]

A user can slide and move the lens cover unit 4 from the first position to the second position by placing fingers on the groove 45, and then pressing the same in the direction indicated by an arrow S2 in FIG. 3. The projection 46 of the lens cover unit 4 illustrated in FIG. 4 is guided along the inside of the guide groove 33d.

The groove 45 extends in a direction orthogonal to the longitudinal direction of the long hole 31a. More specifically, the groove 45 extends in a direction orthogonal to the direction where the lens cover unit 4 slides and moves. Therefore, the press by a user can be efficiently used for the slide movement of the lens cover unit 4.

[Case where Lens Cover Unit 4 is Disposed at Second Position]

In this case, the thick portion 42 of the lens cover unit 4 is brought close to the end portion 312 of the long hole 31a of the bezel 31 as illustrated in FIG. 5 and FIG. 6. Herein, as illustrated in FIG. 6, the through-hole 43 is offset-arranged from the camera 6 and the thick portion 42 is disposed in front of the camera 6.

Due to the fact that the thick portion 42 is disposed in front of the camera 6, the camera 6 is shielded by the thick portion 42. Therefore, the light emitted from the front of the cover 3 is shielded by the thick portion 42 as indicated by an arrow L12 in FIG. 6, and therefore the light collection with the camera 6 is interrupted. More specifically, when the lens cover unit 4 is disposed at the second position, the photographing in front of the cover 3 with the camera 6 is prohibited.

The through-hole 43 of the lens cover unit 4 is disposed at a position corresponding to the shield indicator 33e of the inner cover 33. Therefore, the shield indicator 33e is brought into a state where the shield indicator 33e is visible by a user through the light transmitting cover 44.

Furthermore, the thin portion 41 is disposed in front of the light emitting diode 7. Therefore, light emitted by the light emitting diode 7 is shielded by the thin portion 41 as indicated by an arrow L22, so that the emission to the outside of the cover 3 is prohibited. A user can grasp based on that fact that no light is emitted from the LED hole 31b that the photographing in front of the cover 3 with the camera 6 is impossible.

[Slide Movement of Lens Cover Unit 4 from Second Position to First Position]

A user can slide and move the lens cover unit 4 from the second position to the first position by placing fingers on the groove 45, and then pressing the same in the direction indicated by an arrow S3 in FIG. 5. The projection 46 of the lens cover unit 4 illustrated in FIG. 6 is guided along the inside of the guide groove 33d.

Thus, in the lens cover unit 4, the thick portion 42 which is the camera shielding portion and the light transmitting cover 44 which is the light transmitting portion are integrally configured. In other words, a lens cover which is generally used as one transmitting light while protecting a camera also has a portion capable of shielding light and is configured so that the functions can be switched by the movement.

Next, operational effects of the Laptop PC 1 according to the first embodiment are described.

According to the aspect of the Laptop PC 1, the lens cover unit 4 is partially accommodated in the cover 3. Therefore, there is no necessity of preparing a member shielding the camera 6 separately from the Laptop PC 1.

The lens cover unit 4 is movable between the first position and the second position. When the lens cover unit 4 is disposed at the first position, the light transmitting cover 44 of the lens cover unit 4 faces the camera 6, and therefore photographing with the camera 6 is enabled. On the other hand, when the lens cover unit 4 is disposed at the second position, the thick portion 42 of the lens cover unit 4 shields the camera 6, and therefore photographing with the camera 6 is prohibited. Thus, by selectively disposing the lens cover unit 4 at the first position and the second position by a user, the state where the photographing with the camera 6 is enabled and the state where the photographing with the camera 6 is prohibited can be switched.

The long hole 31a is formed in the cover 3. The lens cover unit 4 is disposed in the long hole 31a and is configured so as to be slidable and movable in the longitudinal direction of the long hole 31a. According to this aspect, the lens cover unit 4 can be configured so as to be slidable and movable by a compact configuration.

The thick portion 42 and the light transmitting cover 44 are disposed as to be adjacent to each other in the longitudinal direction of the long hole 31a. According to this aspect, by sliding and moving the lens cover unit 4 in the longitudinal direction of the long hole 31a, the portion where the camera 6 is to be disposed can be easily switched to the thick portion 42 or the light transmitting cover 44.

At a portion facing the light transmitting cover 44 when the lens cover unit 4 is disposed at the second position of the cover 3, the shield indicator 33e indicating that the thick portion 42 shields the camera 6 is provided. According to this aspect, when the lens cover unit 4 is disposed at the second position, the shield indicator 33e is brought into a state where the shield indicator 33e is visible by a user through the light transmitting cover 44. Therefore, a user can grasp based on the shield indicator 33e that the camera 6 is shielded by the lens cover unit 4.

In the thick portion 42, the groove 45 which is a hold for a user to place fingers is formed. The groove 45 is a groove extending in a direction orthogonal the longitudinal direction of the long hole 31a. According to this aspect, the hold for a user to place fingers can be compactly configured and the press by a user can be efficiently used for the slide movement of the lens cover unit 4.

The Laptop PC 1 has the light emitting diode 7 emitting light when the camera 6 is energized. The lens cover unit 4 has the thin portion 41 in a portion different from the portion of the thick portion 42. When the lens cover unit 4 is disposed at the first position, the thin portion 41 is disposed at a position where light emitted by the light emitting diode 7 is not shielded. When the lens cover unit 4 is disposed at the second position, the thin portion 41 shields the light emitting diode 7. According to this configuration, a user can grasp based on the light of the light emitting diode 7 whether the photographing in front of the cover 3 with the camera 6 is enabled.

Second Embodiment

Next, a Laptop PC according to a second embodiment is described with reference to FIG. 7 to FIG. 10. The Laptop PC according to the second embodiment is different in the configuration around the camera 6 from the configuration of the Laptop PC 1 according to the first embodiment. The same configurations as those of the first embodiment among the configurations of the second embodiment are designated by the same reference numerals and a description thereof is omitted as appropriate.

Figure 7:
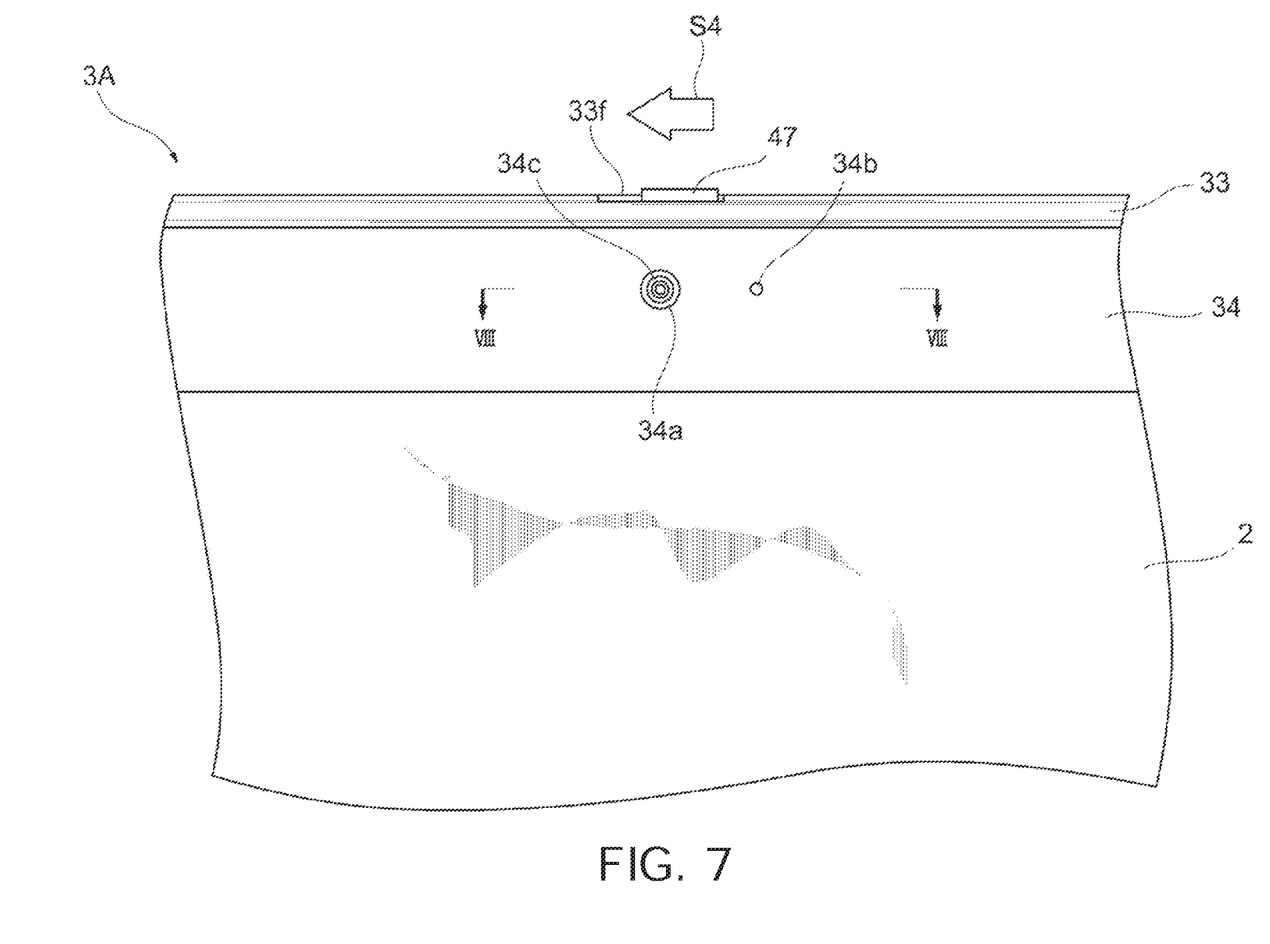
FIG. 7 is a front view illustrating a Laptop PC according to a second embodiment.
Figure 8:
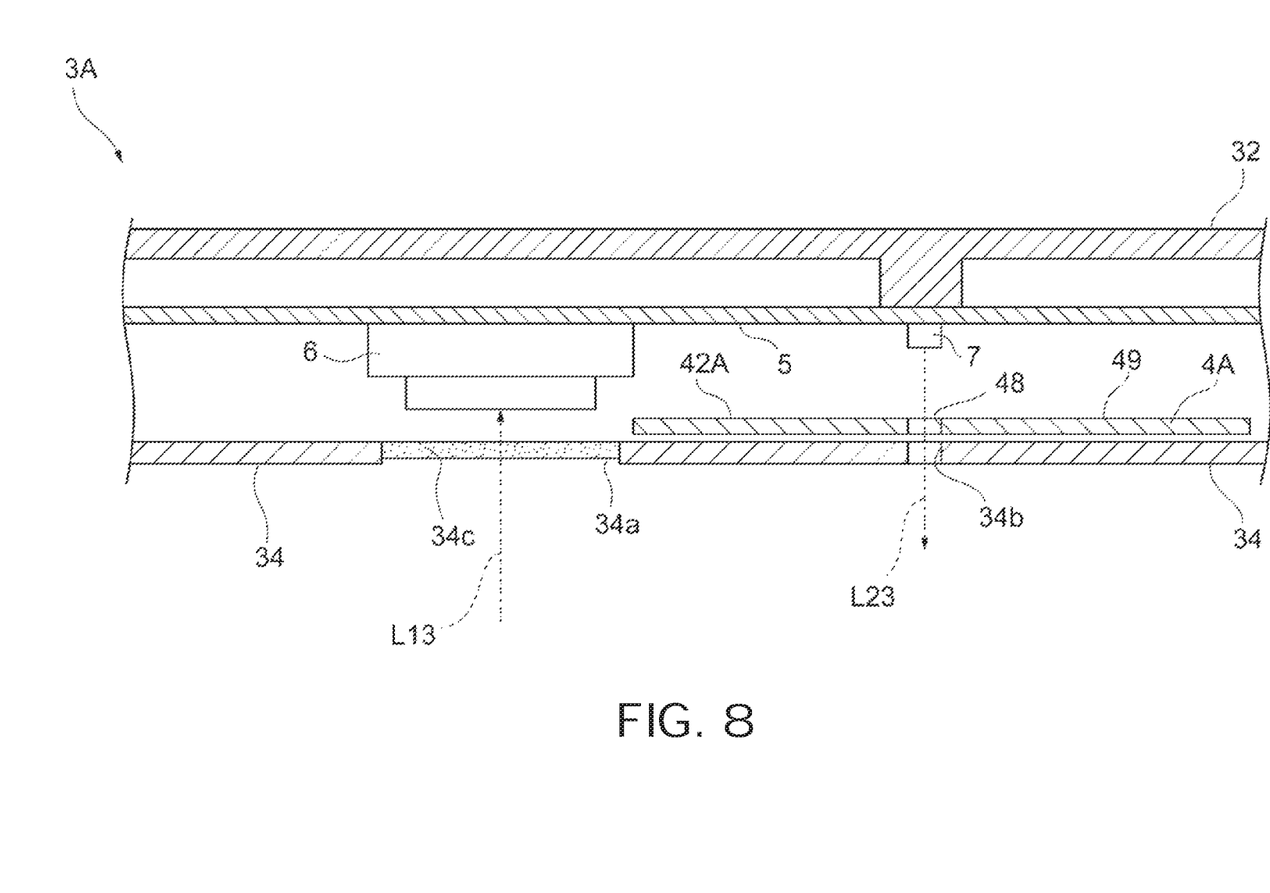
FIG. 8 is a cross-sectional view illustrating a VIII-VIII cross section of FIG. 7.
Figure 9:
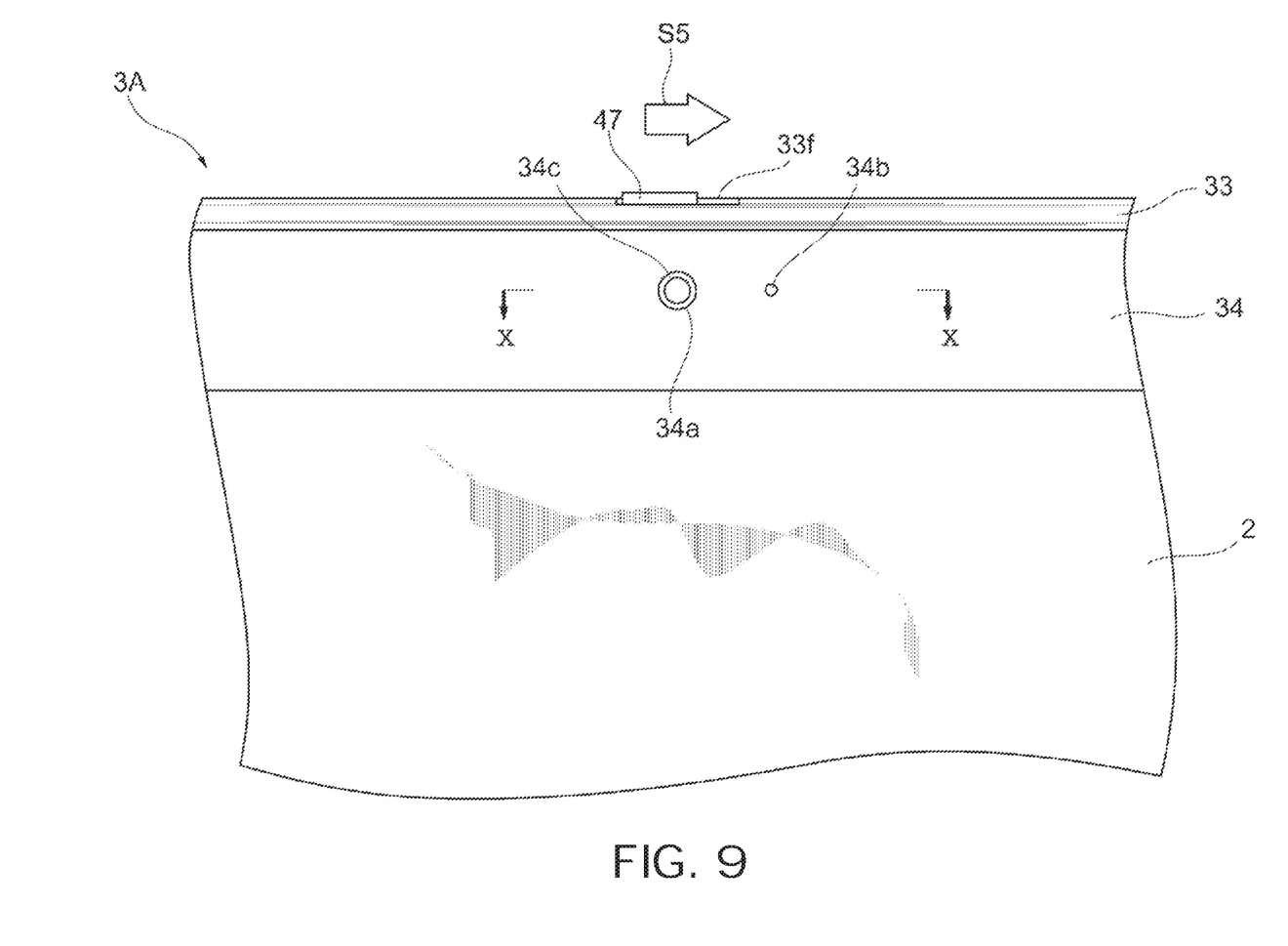
FIG. 9 is a front view illustrating a Laptop PC of FIG. 7.
Figure 10:
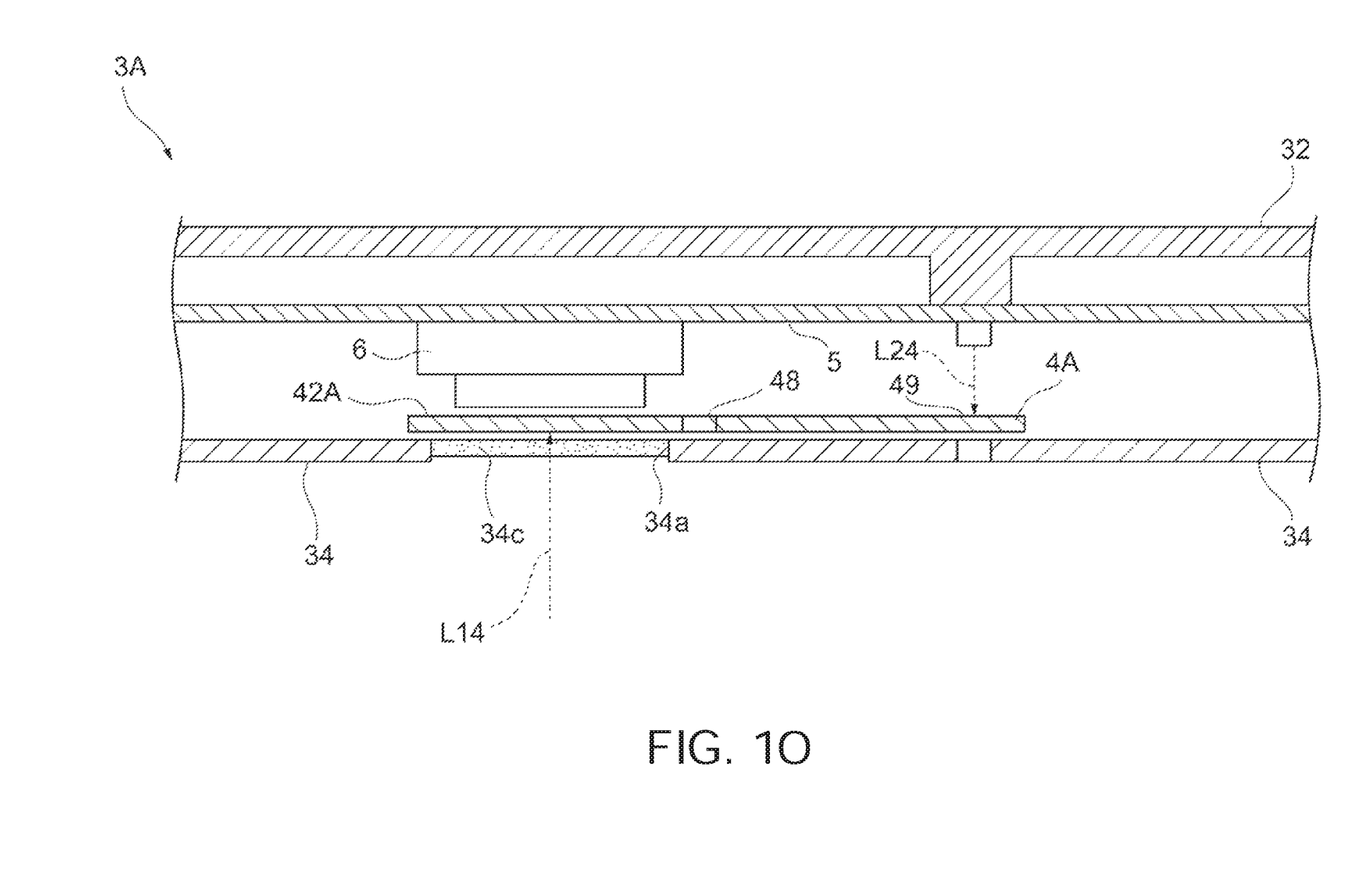
FIG. 10 is a cross-sectional view illustrating an X-X cross section of FIG. 9.

The Laptop PC according to the second embodiment has a shutter 4A which is slidable and movable between a first position and a second position. FIG. 7 and FIG. 8 illustrate a cover 3A in a state where the shutter 4A is disposed at the first position. FIG. 7 is a front view illustrating a portion equivalent to the II portion of FIG. 1. FIG. 8 is a cross-sectional view illustrating a VIII-VIII cross section of FIG. 7. FIG. 9 and FIG. 10 illustrate the cover 3A in a state where the shutter 4A is disposed at the second position. FIG. 9 is a front view illustrating a portion equivalent to the II portion of FIG. 1. FIG. 10 is a cross-sectional view illustrating an X-X cross section of FIG. 9.

As illustrated in FIG. 7, the cover 3A according to the second embodiment has a bezel 34. A camera hole 34a and an LED hole 34b are formed in an upper-end portion and in a substantially central portion in the width direction of the bezel 34 of the raised the cover 3A. Both the camera hole 34a and the LED hole 34b penetrate the bezel 34 in the thickness direction.

As illustrated in FIG. 8, a light transmitting cover 34c is fitted to the camera hole 34a. The light transmitting cover 34c is formed of resin materials transmitting visible light, such as polyethylene terephthalate, polystyrene, polypropylene, and acryl. The LED hole 34b is disposed on the side of the camera hole 34a.

As illustrated in FIG. 8, the shutter 4A has a thin plate shape and is entirely accommodated in the cover 3A. The shutter 4A is formed of a resin material not transmitting visible light and has a camera shielding portion 42A and an LED shielding portion 49. The LED shielding portion 49 is an example of an energization indicator shielding portion. Moreover, an LED hole 48 is formed in a portion between the camera shielding portion 42A and the LED shielding portion 49 of the shutter 4A. The LED hole 48 penetrates the shutter 4A in the thickness direction. The shutter 4A can be disposed at the first position and the second position as described later by slide movement in the width direction in the cover 3A.

As illustrated in FIG. 7, a slit 33f is formed in the upper-end portion of the inner cover 33. The slit 33f is formed so as to extend along the width direction and penetrate the cover 3.

A knob 47 is disposed in the slit 33f. In the cover 3A, the knob 47 is fixed to the shutter 4A by a mechanism (not illustrated). The shutter 4A is configured so as to slide and move, in connection with the slide movement of the knob 47 in the slit 33f, in the same direction.

[Case where Shutter 4A is Disposed at First Position]

In this case, as illustrated in FIG. 8, the camera shielding portion 42A of the shutter 4A is offset-arranged from the camera 6, so that the shutter 4A is not disposed in front of the camera 6. Therefore, as indicated by an arrow L13 FIG. 8, the camera 6 collects light through the light transmitting cover 34c from the front of the cover 3A, and generates image data based on the light collection. More specifically, when the shutter 4A is disposed at the first position, the photographing in front of the cover 3A with the camera 6 is enabled.

Moreover, as illustrated in FIG. 8, the LED hole 48 of the shutter 4A is disposed in front of the light emitting diode 7. Therefore, light emitted by the light emitting diode 7 is emitted to the outside of the cover 3A through the LED hole 48 of the shutter 4A and the LED hole 34b of the bezel 34 as indicated by an arrow L23. A user can grasp based on the fact that light is emitted from the LED hole 34b that the camera 6 can photograph the front of the cover 3A.

[Slide Movement of Shutter 4A from First Position to Second Position]

A user can slide and move the shutter 4A from the first position to the second position by placing fingers on the knob 47, and then pressing the same in the direction indicated by an arrow S4 in FIG. 7.

[Case where Shutter 4A is Disposed at Second Position]

In this case, as illustrated in FIG. 10, the camera shielding portion 42A of the shutter 4A is disposed in front of the camera 6. Therefore, light from the front of the cover 3 toward the camera 6 is shielded by the camera shielding portion 42A as indicated by an arrow L14, and the light collection with the camera 6 is interrupted. More specifically, when the shutter 4A is disposed at the second position, the photographing in front of the cover 3A with the camera 6 is prohibited.

Furthermore, an LED shielding portion 49 of the shutter 4A is disposed in front of the light emitting diode 7. Therefore, light emitted by the light emitting diode 7 is shielded by the LED shielding portion 49 as indicated by an arrow L24, so that the emission to the outside of the cover 3A is prohibited. A user can grasp based on the fact that no light is emitted from the LED hole 34b that the camera 6 cannot photograph the front of the cover 3A.

[Slide Movement of Shutter 4A from Second Position to First Position]

A user can slide and move the shutter 4A from the second position to the first position by placing fingers on the knob 47, and then pressing the same in the direction indicated by an arrow S5 in FIG. 9.

Next, operational effects of the Laptop PC according to the second embodiment are described.

The camera hole 34a is formed in the cover 3A. The camera 6 is disposed so as to perform photographing through the camera hole 34a. The shutter 4A is entirely accommodated in the cover 3A.

According to this aspect, there is no necessity of preparing a member shielding the camera 6 separately from the Laptop PC. Moreover, the mechanism for moving the shutter 4A can be protected by the cover 3A.

Moreover, the shutter 4A is configured so as to be slidable and movable in a direction orthogonal the thickness direction of the cover 3A. According to this aspect, an increase in the thickness of the cover 3A accommodating the shutter 4A can be prevented while making the shutter 4A movable.

As described above, the embodiments of the present invention are described with reference to specific examples. However, the present invention is not limited to the specific examples. More specifically, those obtained by adding design changes to the specific examples described above as appropriate by a person skilled in the art are also included in the scope of the present invention insofar as they have the features of the present invention. The elements of the specific examples described above and the arrangement, materials, conditions, shapes, sizes, and the like thereof are not limited to those described as examples and can be altered as appropriate.

The invention claimed is:

1. An electronic device, comprising:
a display panel displaying predetermined information;
a cover surrounding a circumference of the display panel;
a camera in the cover and can photograph in front of the cover; and
a lens cover unit integrally configured with a light transmitting portion formed of a material transmitting light and a camera shielding portion formed of a material not transmitting light, wherein:
the lens cover unit is at least partially accommodated in the cover and is movable between a first position where the light transmitting portion faces the camera and a second position where the camera shielding portion shields the camera;
a long hole is formed in the cover,
the lens cover unit is disposed in the long hole and is configured to be slidable and movable in a longitudinal direction of the long hole,
the camera shielding portion and the light transmitting portion are adjacent to each other in the longitudinal direction of the long hole, and
a shield indicator, indicating that the camera shielding portion shields the camera, is at a portion facing the light transmitting portion when the lens cover unit is at the second position of the cover.

2. The electronic device according to claim 1, wherein:
a hold for a user to place a finger is on the camera shielding portion.

3. The electronic device according to claim 2, wherein:
the hold is a groove extending in a direction orthogonal to the longitudinal direction of the long hole.

4. An electronic device, comprising:
a display panel displaying predetermined information;
a cover surrounding a circumference of the display panel;
a camera in the cover and can photograph in front of the cover; and
a lens cover unit integrally configured with a light transmitting portion formed of a material transmitting light and a camera shielding portion formed of a material not transmitting light, wherein:
the lens cover unit is at least partially accommodated in the cover and is movable between a first position where the light transmitting portion faces the camera and a second position where the camera shielding portion shields the camera;
an energization indicator emitting light that indicates when the camera is energized, wherein:
the lens cover unit has an energization indicator shielding portion at a portion different from the camera shielding portion, and
the energization indicator shielding portion is at a position where the energization indicator shielding portion does not shield light emitted by the energization indicator when the lens cover unit is disposed at the first position and shields the energization indicator when the lens cover unit is at the second position.

* * * * *